United States Patent

[11] 3,631,569

[72] Inventors: Clifford Alexander Seckerson, Iver Heath; Barry Roger Michael Barnett, West Drayton, both of England
[21] Appl. No.: 47,058
[22] Filed: June 17, 1970
[45] Patented: Jan. 4, 1972
[73] Assignee: TRW Inc., Cleveland, Ohio
[32] Priority: June 23, 1969
[33] Great Britain
[31] 31,681/69

[54] FASTENER
6 Claims, 5 Drawing Figs.
[52] U.S. Cl. ................................. 24/73 HS, 52/718
[51] Int. Cl. ................................. A44b 19/06
[50] Field of Search ................ 52/716–718; 24/73 HS, 73 MF, 81 BM

[56] References Cited
UNITED STATES PATENTS
3,373,539 3/1968 Meyer .................. 52/718
3,403,881 10/1968 Bennett et al. .......... 24/73 HS X FOREIGN PATENTS
781,200 8/1957 Great Britain ............ 52/718

Primary Examiner—Donald A. Griffin
Attorneys—Philip E. Parker, Gordon Needleman, James R. O'Connor, John Todd and Hall & Houghton ABSTRACT: A resilient sheet metal fastener for attaching an article such as a molding to a headed stud which is attached to a support surface. The fastener comprises a U-shaped portion having two limbs joined by a web and a slot extending into one limb from the end remote from the web. A pair of resilient tongues projects outwardly from the limb formed with the slot one on each side of the slot and an arm adapted to engage the article projects outwardly from the other limb. In use the U-shaped portion is slidingly engaged over the head of the stud with the shank of the stud extending through the slot and with the tongues compressed against the support surface so as to urge the said one limb against the head of the stud. To prevent accidental dislodgement of the clip from the head of the stud a catch projects across the open mouth of the U-shaped portion.

PATENTED JAN 4 1972 3,631,569

FASTENER

BACKGROUND TO THE INVENTION

It is known, for instance in British Pat. No. 1,173,065, to provide a sheet metal clip for attaching an article, such as a molding, on a headed stud. This known type of clip comprises a flat body portion, which is formed with a slot, and an upwardly extending tongue which is also slotted and which engages against the undersurface of the head of the stud. In use the shank of the stud is passed laterally along the slots in the body portion and the tongue to locate the tongue beneath the head, with the body portion clamped against the support surface on which the stud is attached. The body portion is provided with an arm or projection which is used to clamp a flange of the molding against the support surface.

This known type of clip has the disadvantage that the arm or projection for engaging the molding extends outwardly to one side of the stud and therefore prevents the molding from being positioned close to the stud. In many applications, where space is at a premium, this known type of clip takes up too much space and is impractical. In addition, the clamping pressure exerted upon the flange of the molding is determined by the downward pressure exerted by the tongue, which engages beneath the head of the stud, and if the stud, owing to manufacturing tolerances, is longer than the specified length, the clamping pressure exerted on the flange is weakened. It is also common to find surface irregularities around the weld between the stud and the support surface which result in the body portion, and consequently the molding engaging arm, being raised permanently clear of the support surface so that the clamping pressure exerted by the arm on the molding is substantially reduced or, in extreme cases, becomes nonexistent.

It is an object of the present invention to provide a resilient fastener which obviates or at least substantially reduces all of the above-described disadvantages of known clips of this type.

STATEMENT OF THE INVENTION

According to the present invention there is provided a resilient fastener for attaching an article to a stud having a shank attached to a support surface and a head at the end of the shank, the fastener comprising a U-shaped portion formed by two generally parallel limbs joined by a web, one of the limbs having a slot therein extending into the limb from the end thereof remote from the web so that the U-shaped portion can be slidingly engaged on the stud with the head located between the limbs and the shank extending through the slot, a pair of resilient tongues projecting outwardly from the said one limb one on each side of the said slot and adapted to engage the support surface and act as a leaf spring to clamp the said one limb against the head of the stud, an arm projecting outwardly from the other limb and adapted to engage a said article and a catch projecting across the mouth of the U-portion so as to resist withdrawal of the head of the stud from the two limbs.

DESCRIPTION OF THE PREFERRED EMBODIMENT

Figure 1:
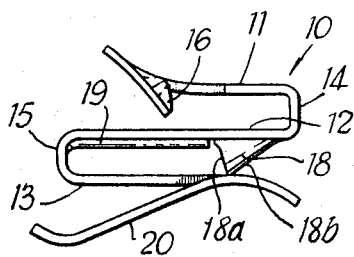
FIG. 1 is a side elevation of a fastener according to the invention.
Figure 2:
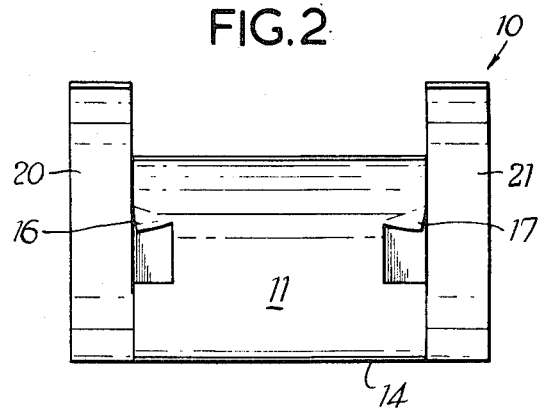
FIG. 2 is a plan view of the fastener of FIG. 1
Figure 3:
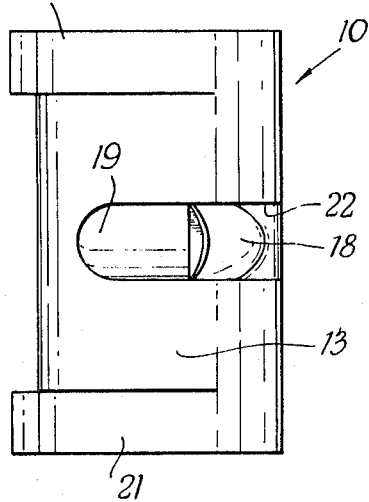
FIG. 3 is an underplan of the fastener of FIG. 1.
Figure 4:
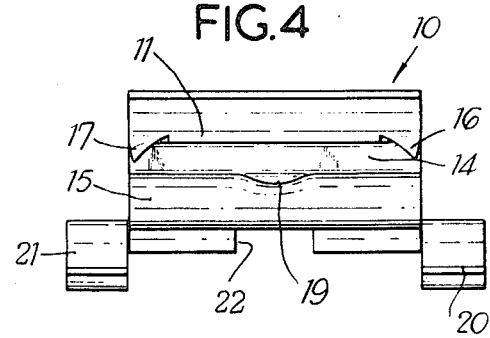
FIG. 4 is a front elevation of the fastener of FIG. 1.

In the drawing, a fastener is indicated generally at 10 which is formed from a single strip of sheet metal in a conventional manner and which is rendered resilient and preferably rustproof during manufacture.

The fastener 10 is generally S-shaped and comprises an arm 11 and two generally parallel limbs 12 and 13. The arm 11 is joined to the limb 12 by a web 14 and the two limbs 12 and 13 are joined by a web 15 so as to form a U-shaped portion.

A pair of prongs 16 and 17 are sheared and bent from the arm 11 so as to project inwardly towards the limb 12 and rearwardly towards the web 14 and the arm 11, limb 12 and web 14 form a U-shaped edge clip adapted to grip a panel edge.

A lug 18 is sheared and pressed from the limb 12 adjacent the web 14 so as to project from the limb 12 towards the limb 13 and a rib 19 is pressed from the limb 12 so as to project towards the limb 13 and extend from the web 15 up to the lug 18. The lug 18 has a sharply inclined abutment surface 18a facing the web 15 and a ramp surface 18b facing in the opposite sense. A pair of resilient tongues 20 and 21 are sheared from the sides of the limb 13 and inclined outwardly and downwardly of the limb 13 with their free ends positioned adjacent the web 15. A slot 22 is sheared along the center of the limb 13 in parallel with the tongues 20 and 21 from the end of the limb remote from the web 15 and the lug 18 projects into the slot 22.

Figure 5:
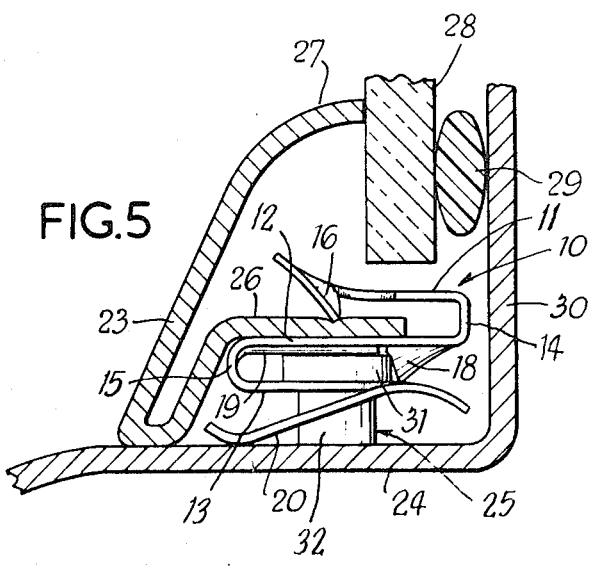
FIG. 5 is an elevation, partly in section, showing a molding secured to a headed stud, which is welded to a support surface, with the aid of the fastener of FIGS. 1 to 4.

The fastener 10 is used, as shown in FIG. 5 to attach a molding 23 to a support panel 24 having a welded stud 25 projecting therefrom. As can be seen from FIG. 5, the molding 23 has a flange 26 which is gripped by the fastener 10 and a further flange 27 which bears against a glass panel 28 to hide the gap formed between the panel 28 and the panel 24. A seal 29 is located between the glass panel 28 and a vertical flange 30 of the support panel 24 and the glass panel 28 is adhered to the vertical flange 30 by the seal 29.

In order to make the assembly shown in FIG. 5, the fastener 10 is first attached on the stud 25. The stud 25 has a head 31 and a shank 32 and the limb 13 is slid beneath the head 31 so that the shank 32 of the stud passes along the slot 22. As the head 31 is forced between the limbs 12 and 13 of the fastener, it engages the lug 18 and the surface 18b of the lug acts as a ramp surface, forcing the limbs 12 and 13 apart until the head snaps past the lug. Thereafter, the clip is retained on the stud by the abutment surface 18a of the lug 18. The tongues 20 and 21 of the clip are deflected by the upper surface of the support panel 24 and clamp the limb 13 against the head of the stud to prevent any vibration between the fastener and the stud. Vibration between the fastener and the stud is also prevented by the rib 19 in the limb 12, which bears against the upper surface of the head 31 of the stud.

When the fastener is engaged on the stud, the flange 26 of the molding 23 is introduced between the arm 11 and limb 12 of the fastener where it is held by the prongs 16 and 17. The flange 26 is forced between the arm 11 and limb 12 sufficiently to ensure that the flange 27 of the molding bears firmly against the surface of the glass panel 28 to provide a decorative finish to the panel 28 and hides the gap between the panel 28 and the support panel 24.

The tongues 20 and 21 are spaced apart by the width of the limb 13 and consequently they bear against the upper surface of the panel 24 at points spaced substantially from the stud 25. Any surface irregularities caused by the weld between the stud and the panel 24 are thus unlikely to affect the action of the tongues. Furthermore, since the tongues 20, 21 serve only to clamp the limb 13 against the head 31 to reduce vibration and the head of the stud is clamped permanently between the rib 19 and the limb 13, if the shank of the stud is longer than it should be, owing for instance to normal manufacturing tolerances, the fastener is still attached securely to the head of the stud and the molding is still attached securely to the fastener. In addition, the flange 26 of the molding overlies the stud 25 so that the molding can be positioned closely adjacent to the stud, thereby taking up the minimum amount of space.

A further advantage of the clip of the present invention is that it is adapted to grip a flat edge portion of the molding and the grip achieved on the molding is independent of any projections, deformations or lipping formed in the molding.

Further minor modifications can be made to the above-described embodiment without departing from the spirit and scope of the invention which is best described in the following claims.

What we claimed is:

1. A resilient fastener for attaching an article to a stud having a shank attached to a support surface and a head at the end of the shank, the fastener comprising a U-shaped portion formed by two generally parallel limbs joined by a web, one of the limbs having a slot therein extending into the limb from the end thereof remote from the web so that the U-shaped portion can be slidingly engaged on the stud with the head located between the limbs and the shank extending through the slot, a pair of resilient tongues projecting outwardly from the said one limb one on each side of the said slot and adapted to engage the support surface and act as a leaf spring to clamp the said one limb against the head of the stud, an arm projecting outwardly from the other limb and adapted to engage a said article and a catch projecting across the mouth of the U-portion so as to resist withdrawal of the head of the stud from the two limbs.

2. A fastener as claimed in claim 1, wherein the said catch comprises a lug sheared and bent from the other limb so as to have a sharply inclined surface facing the web which acts as an abutment and a ramp surface facing in the opposite sense.

3. A fastener as claimed in claim 2, wherein the said arm extends outwardly from the end of the other limb remote from the web and is reversely bent so as to overlie the other limb and form therewith a U-shaped edge clip adapted to grip a panel edge.

4. A fastener as claimed in claim 3, wherein prongs are sheared from the arm so as to project inwardly and rearwardly of the edge clip.

5. A fastener as claimed in claim 1, wherein the said arm extends outwardly from the end of the other limb remote from the web and is reversely bent so as to overlie the other limb and form therewith a U-shaped edge clip adapted to grip a panel edge.

6. A fastener as claimed in claim 5, wherein prongs are sheared from the arm so as to project inwardly and rearwardly of the edge clip.

* * * * *